United States Patent
Igarashi et al.

(10) Patent No.: US 9,074,088 B2
(45) Date of Patent: Jul. 7, 2015

(54) ADHESIVE RESIN COMPOSITION, AND LAMINATE USING THE SAME

(75) Inventors: Takeyuki Igarashi, Kurashiki (JP); Kaoru Ikeda, Kurashiki (JP); Tomoyuki Watanabe, Zwijndrecht (BE)

(73) Assignee: Kuraray Co., Ltd., Kurashiki-shi (JP)

( * ) Notice: Subject to any disclaimer, the term of this patent is extended or adjusted under 35 U.S.C. 154(b) by 1303 days.

(21) Appl. No.: 12/593,791

(22) PCT Filed: Mar. 28, 2008

(86) PCT No.: PCT/JP2008/056122
§ 371 (c)(1),
(2), (4) Date: Sep. 29, 2009

(87) PCT Pub. No.: WO2008/123426
PCT Pub. Date: Oct. 16, 2008

(65) Prior Publication Data
US 2010/0119856 A1    May 13, 2010

(30) Foreign Application Priority Data
Mar. 30, 2007   (JP) ................. 2007-093121

(51) Int. Cl.
| | | |
|---|---|---|
| *B32B 27/08* | (2006.01) | |
| *B32B 27/32* | (2006.01) | |
| *C08L 31/00* | (2006.01) | |
| *C08L 51/00* | (2006.01) | |
| *B29C 47/00* | (2006.01) | |
| *C08F 265/00* | (2006.01) | |
| *C08F 265/02* | (2006.01) | |
| *C08F 267/04* | (2006.01) | |
| *C09J 123/02* | (2006.01) | |
| *C09J 123/10* | (2006.01) | |
| *C09J 151/00* | (2006.01) | |
| *C09J 151/06* | (2006.01) | |
| *B29C 47/06* | (2006.01) | |
| *C08L 29/06* | (2006.01) | |

(52) U.S. Cl.
CPC ............ *C08L 51/003* (2013.01); *B29C 47/0021* (2013.01); *B29C 47/06* (2013.01); *B32B 27/08* (2013.01); *B32B 27/32* (2013.01); *C08F 265/00* (2013.01); *C08F 265/02* (2013.01); *C08F 267/04* (2013.01); *C08L 29/06* (2013.01); *C09J 123/02* (2013.01); *C09J 123/10* (2013.01); *C09J 151/003* (2013.01); *C09J 151/06* (2013.01)

(58) Field of Classification Search
USPC .......................................... 428/515, 516, 518
See application file for complete search history.

(56) References Cited

U.S. PATENT DOCUMENTS

| | | | |
|---|---|---|---|
| 3,687,457 A | 8/1972 | Mason et al. | |
| 4,058,647 A | 11/1977 | Inoue et al. | |
| 4,822,688 A | 4/1989 | Nogues | |
| 5,041,338 A | 8/1991 | Suehiro et al. | |
| 6,211,290 B1 * | 4/2001 | Xiao et al. | 525/70 |
| 7,495,055 B2 * | 2/2009 | Soerens et al. | 524/588 |
| 2003/0175538 A1 * | 9/2003 | Yamaguchi et al. | 428/515 |
| 2006/0029820 A1 * | 2/2006 | Miller | 428/474.4 |
| 2006/0106151 A1 * | 5/2006 | Sakamoto | 524/494 |
| 2007/0021566 A1 * | 1/2007 | Tse et al. | 525/240 |
| 2007/0148481 A1 * | 6/2007 | Onishi | 428/474.4 |
| 2008/0254279 A1 | 10/2008 | Murata et al. | |
| 2009/0104830 A1 * | 4/2009 | Ikeda | 442/290 |
| 2009/0105396 A1 * | 4/2009 | Fujihara et al. | 524/505 |
| 2009/0280318 A1 * | 11/2009 | Matsugi et al. | 428/334 |

FOREIGN PATENT DOCUMENTS

| | | | |
|---|---|---|---|
| EP | 0 634 424 A1 | 1/1995 | |
| EP | 1 167 425 | 1/2002 | |
| JP | 48 5527 | 10/1973 | |
| JP | 51 98784 | 8/1976 | |
| JP | 52 26548 | 2/1977 | |
| JP | 54 40112 | 12/1979 | |
| JP | 54 40113 | 12/1979 | |
| JP | 56 41205 | 4/1981 | |
| JP | 63 172644 | 7/1988 | |
| JP | 2 150481 | 6/1990 | |
| JP | 2006 307208 | 11/2006 | |
| WO | WO 00/12801 A1 | 3/2000 | |
| WO | WO2007/026893 | * | 3/2007 |
| WO | 2007 057960 | 5/2007 | |
| WO | WO2007/066749 | * | 6/2007 |

OTHER PUBLICATIONS

English Translation of JP 2005-187590, Miyahara et al., Jul. 2005.*
Extended Supplementary European Search Report issued Jul. 1, 2010 in European Application No. 08 73 9240.
Office Action issued Aug. 3, 2012, in Europe Patent Application No. 08 739 240.3-1214.

* cited by examiner

*Primary Examiner* — Ronak Patel
(74) *Attorney, Agent, or Firm* — Oblon, McClelland, Maier & Neustadt, L.L.P.

(57) ABSTRACT

Laminates in which a layer of a polar resin (C) is laminated with a layer of a polyolefin (D) or a recovered resin (E) via a layer of an adhesive resin composition (A), including an ethylene-vinyl alcohol copolymer, the adhesive resin composition (A) is produced by mixing a resin having an unsaturated carboxylic acid anhydride or derivative thereof (a1) with a ring-opening polymer or condensation polymer (a2) having a hydroxyl group or an amino group at both ends or at one end; or partially grafting the (a2) with the (a1).

15 Claims, No Drawings

US 9,074,088 B2

ADHESIVE RESIN COMPOSITION, AND LAMINATE USING THE SAME

CROSS REFERENCE TO RELATED APPLICATIONS

The present application is the national stage of international application PCT/JP2008/056122, filed on Mar. 28, 2008, and claims the benefit of the filing date of Japanese Application No. 2007-093121, filed on Mar. 30, 2007.

TECHNICAL FIELD

The present invention relates to an adhesive resin composition (A) for a resin composition comprising an ethylene-vinyl alcohol copolymer, the adhesive resin composition (A) is produced by mixing a resin having an unsaturated carboxylic acid anhydride or derivative thereof (a1) with a ring-opening polymer or condensation polymer (a2) having a hydroxyl group or an amino group at both ends or at one end; or partially grafting the (a2) with the (a1). The present invention also relates to a laminate in which a layer of a polar resin (C) is laminated with a layer of a polyolefin (D) or a recovered resin (E) via a layer of a resin composition comprising the resin composition (A) and a polyolefin. The present invention further relates to applications and production methods of the laminate.

BACKGROUND ART

Since plastic containers composed of a thermoplastic resin are excellent in, for example, lightness of weight, economical efficiency, shaping processability, impact resistance, transparency, reusability, they are used as containers for packaging foods and drinks more widely than conventional containers made of metal, glass, or the like. In particular, since laminates of a polyolefin resin and an ethylene-vinyl alcohol copolymer (hereinafter, this may be referred to as EVOH) or laminates of a polyolefin resin and a polyamide have low oxygen permeability and low water vapor permeability, they are widely used for, for example, containers of foods and drugs. Because there are increasing demands for long term storage performance, health and safety properties, and the like in foods and drinks in recent years due to the diversified lifestyles, awareness to safety, and the like of the consumers, containers made of multilayer structures having a layer of a barrier material are preferably used.

Further, plastic containers have increasing importance in containers to which high temperature processing for retort processing is applicable (hereinafter, may be simply referred to as "retort containers") for the purpose of sterilizing and storing, or heating the contents in containers, particularly for foods and medical items.

However, a polyolefin resin layer and an EVOH or nylon layer have poor adhesion to each other. For this reason, they are usually laminated by carrying out a method of shaping by coextrusion in which, between each resin layer, an intermediate layer that adheres each layer is provided. As examples of adhesive resins to make such an intermediate layer, polyolefin resins according to Patent Documents 2 and 3 are well known that are graft modified with an unsaturated carboxylic acid or derivative thereof. As a material of same kind, an olefin-unsaturated carboxylic acid copolymer with an unsaturated carboxylic acid or derivative thereof in the main chain is also known.

In addition, as known methods to improve the adhesion strength for polar resins, Patent Document 4 discloses a method of further adding a low density polyethylene to a graft modified polyolefin resin, Patent Document 5 discloses a method of adding a hydrocarbon-based elastomer, and Patent Document 6 discloses a method of melt-kneading a mixture made of a propylene-ethylene block copolymer, an ethylene-α-olefin random copolymer, an unsaturated carboxylic acid or derivative thereof, and an organic peroxide.

However, in such an adhesive resin and such a multilayer structure, carrying out retort processing may decrease the adhesive strength between an intermediate layer comprising an adhesive resin and a barrier resin layer, which may result in peeling. Moreover, the preliminary use of an adhesive resin having high adhesion may result in occurrence of continuous irregularities in the interface of each interlayer, which may be referred to as "orange peel", when producing laminates by, for example, coextrusion and thus the appearance sometimes deteriorate. Even when using, as an adhesive layer, the graft modified polyolefin resins according to Patent Documents 1 to 3 and a composition in which a third component is added to the graft modified polyolefin resins according to Patent Document 4 to 6, the performance is insufficient for any of the applications at normal temperature, applications of boiling processing, and applications of retort processing.

Patent Document 2: JP 51-098784A
Patent Document 3: JP 52-026548A
Patent Document 4: JP 54-040113B
Patent Document 5: JP 54-040112B
Patent Document 6: JP 56-041205A

DISCLOSURE OF THE INVENTION

Problem to be Solved by the Invention

An object of the present invention is to provide an adhesive resin having sufficient adhesion with a polar resin in any of applications at normal temperature and applications of boiling and retort processing, a resin composition comprising the adhesive resin, and further a laminate with polyolefin/polar resin including the resin composition as an intermediate layer.

Means for Solving the Problem

As a result of keen examinations to achieve the objects described above, the present inventors have found an adhesive resin composition (A) for a polar resin, wherein the adhesive resin composition (A) is produced by mixing a resin having a carboxylic acid anhydride or derivative thereof component (a1) with a ring-opening polymer or condensation polymer component (a2) having a hydroxyl group or an amino group at both ends or at one end; or graft-reacting the (a2) component with the (a1) component, and wherein an amount of the (a1) component is such that an acid value of the adhesive resin composition (A) is from 0.1 to 50 mg KOH/g with a potassium hydroxide/ethanol solution, and an amount of the (a2) component is such that y/(x+y)*100 is 10 or more, where x is a sum of peak heights of peaks (1713 $cm^{-1}$, 1780 $cm^{-1}$) derived from an acid anhydride group and y is a height of a peak (1740 $cm^{-1}$) derived from an ester group, all peaks determined by infrared ray (IR) absorption spectrum measurement after melt-kneading the adhesive resin composition (A) at 220° C. for 5 minutes and then cooling to room temperature, enables high adhesion to resin compositions comprising EVOH in an interlayer. The resin composition (A) is used as a resin composition diluted with the polyolefin (B). The present inventors have then found that, when this adhesive resin composition is used for a laminate having a layer of the resin composition (C) comprising EVOH, high adhesion with a polar resin is maintained in any applications of boiling and retort processing, and thus have come to complete the present invention.

In other words, the present invention is an adhesive resin composition comprising the resin composition (A) and the polyolefin (B), and further a gas barrier laminate having a layer of the polar resin (C) and a layer of the polyolefin (D) or the recovered resin (E) via a layer of the resin composition.

Effect of the Invention

According to the present invention, a resin or a resin composition is provided in which a ring-opening polymer or condensation polymer (a2) having a hydroxyl group or an amino group at both ends or at one end, which is present in the resin composition (A), and EVOH produce the compatibilizing or anchoring effect and thereby high adhesion, which is not achieved by conventional techniques, is enabled in the interlayer between a layer comprising the resin composition (A) and a layer of the polar resin (C).

In addition, according to the present invention, a laminate is provided that is highly adhesive to a layer of the resin composition (C) comprising EVOH in any of the applications of boiling and retort processing.

BEST MODE FOR CARRYING OUT THE INVENTION

The present invention is the adhesive resin compositions (A) for polar resins, in which the component (a2) below is mixed with a resin having the component (a1) below or is grafted to the component (a1), and the amount of the component (a1) satisfies the condition ($\alpha$) below and the amount of the component (a2) satisfies the condition ($\beta$) below.

Component (a1): a carboxylic acid anhydride or a derivative thereof.

Component (a2): a ring-opening polymer or a condensation polymer, having a hydroxyl group or an amino group at both ends or at one end Condition ($\alpha$): an acid value of from 0.1 to 50 mg KOH/g with a potassium hydroxide/ethanol solution.

Condition ($\beta$): y/(x+y)*100 is 10 or more, where x is a sum of peak heights of peaks (1713 $cm^{-1}$, 1780 $cm^{-1}$) derived from an acid anhydride group and y is a height of a peak (1740 $cm^{-1}$) derived from an ester group, all peaks determined by infrared ray (IR) absorption spectrum measurement after melt-kneading the adhesive resin composition (A) at 220° C. for 5 minutes and then cooled to room temperature.

The unsaturated carboxylic acid or derivative thereof (a1) is a compound that can react with an OH group in EVOH for esterification or transesterification, and examples of such a unsaturated carboxylic acid or derivative thereof include maleic anhydride, citraconic anhydride, 2,3-dimethylmaleic anhydride, bromomaleic anhydride, chloromaleic anhydride, dichloromaleic anhydride, crotonic anhydride, 3,4,5,6-tetrahydrophthalic anhydride, itaconic anhydride, and glutaconic anhydride. Among these, maleic anhydride is most typical of production.

The resin having an unsaturated carboxylic acid or derivative thereof (a1) may be a resin that has a structure as a graft polymer in which an unsaturated carboxylic acid or derivative thereof (a1) is added by graft-reacting, or a structure as a copolymer of an $\alpha$-olefin and an unsaturated carboxylic acid or derivative thereof (a1), and the both are applicable to the present invention.

As a resin to be a main material for the structure as a graft polymer, hydrocarbon-based resins may be used. The hydrocarbon-based resins in this context are resins composed mainly of carbon and hydrogen, and it also may have functional groups of, for example, ether bonds, ester groups, and amide bonds, unless the effect of the present invention is inhibited. From the perspective of the high stability of maleated thermoplastic resins and avoiding reaction and interaction with additives and the like comprised in the adhesive resin compositions, hydrocarbon resins without having such functional groups are usually used.

Examples of such a hydrocarbon-based resin include the followings: polymers of $\alpha$-olefin, such as polyethylene, polypropylene, polybutene, poly(4-methyl)pentene, polyhexene, polyoctene, polydecene and polydodecene; random copolymers composed of $\alpha$-olefin to be the raw materials for the polymers mentioned above, such as ethylene-propylene, ethylene-butene, and propylene-butene copolymers; and further block polymers in which polystyrene is bonded to the polymers or copolymers described above as a block polymer, such as styrene-(ethylene-butene)-styrene triblock copolymers, and styrene-(isoprene-propylene)-styrene triblock copolymers. Since these polymers and copolymers have a structure to be reacted with an unsaturated carboxylic acid or derivative thereof (a1), they are subjected to no limitation in physical properties and chemical structures for use, and moreover, either a single kind of them or a blend of them may be applied.

A hydrocarbon-based resin used preferably in particular for the application of retort is polypropylene because of the melting point exceeding the general retort processing temperature of 120° C. and in view of production. However, for applications not requiring the retort resistance, polyethylene or copolymers such as styrene-(ethylene-butene)-styrene triblock copolymers and the like are also preferably used in view of flexibility and production.

In addition, such a hydrocarbon-based resin also has no problem to comprise a copolymer with a diene compound, such as isoprene, butadiene, or octadiene, or a compound containing an aromatic group or a functional group, such as styrene, acrylonitrile, or vinyl acetate in the form of a copolymer with $\alpha$-olefin. Moreover, metathesis polymers, such as polyoctenylene, ring-opening metathesis polymer of cyclooctadiene, and the like can also be applied. However, since thermal stability deteriorates when many double bonds are contained in the main chain of the polyolefin, it is preferred that double bonds are hydrogenated for improvement of the thermal stability in the application of the adhesive resin of the present invention.

One of the characteristics in the present invention is that a ring-opening polymer or condensation polymer (a2) having a hydroxyl group or an amino group at both ends or at one end is partially reacted with an unsaturated carboxylic acid or derivative thereof (a1). The polymer (a2) has a function of assisting the adhesion with a resin composition comprising EVOH by the affinity to EVOH. Because of this function, the adhesive function is more excellent than that of adhesive resins for polar resins, generally called as maleated polyolefin. Accordingly, the polymer (a2) is required to have a structure allowing both reaction with an acid anhydride and compatibility with a resin composition comprising EVOH, and therefore it is essential that it has one or more kinds of functional groups that reacts with an unsaturated carboxylic acid or derivative thereof (a1). Such a ring-opening polymer or condensation polymer (a2) having a hydroxyl group or an amino group at both ends or at one end may be used not only one kind of them but also two or more kinds of them in combination depending on applications.

Examples of the ring-opening polymer or condensation polymer having a hydroxyl group at both ends or at one end include the following representative compounds: polyglycols such as polyethylene glycol, polypropyrene glycol, and the like, which are obtained by polymerizing glycol of two valent alcohol such as ethylene glycol, propyrene glycol, or the like; polyglycols in which one end does not have a hydroxyl group, such as polyglycol ether which are obtained by capping one end with ether, for example, polyethylene glycol monomethyl ether and polyethylene glycol monoethyl ether, and polyglycol ester, for example, ethylene glycol monoacetate, diethylene glycol monoacetate, triethylene glycol monoacetate and polyethelene glycol mono acetate; products having one or more hydroxyl groups in the polyolefin chain, such as partially saponified products of ethylene-vinyl acetate copolymers, and partially saponified products of vinyl acetate copolymers. Such examples also include polyesters having an end partially modified to be an alcohol and epoxy resins partially modified to be an alcohol. Among these, polyglycols having a hydroxyl group at both ends or at one end is preferred that have good affinity with polar resins and have a structure that does not inhibit the adhesion.

Examples of the ring-opening polymer or condensation polymer having an amino group at both ends or at one end include polyethyleneimine and polyamide that has a functional group at an end that can be reacted with an acid anhydride group. In a structure of polyethyleneimine, an example of polyethyleneimine includes one in which the ratio of primary amine, which is reacted with an unsaturated carboxylic acid or derivative thereof (a1) in the present invention to obtain the effect of the invention and may possibly inhibit the adhesion conflictingly, is 50% or less relative to total amine. In addition, examples of the polyethyleneimine also include polyethylene derivatives obtained by carrying out reaction, to amine, of aldehyde, ketone, ester, alkyl halide, isocyanate, and $\alpha,\beta$ unsaturated ketones, for example. The main chain structure of the polyamide is not particularly limited, and examples of the polyamide include 6-nylon, 6,6-nylon, 6,10-nylon, 11-nylon, 12-nylon, nylon copolymers comprising two or more kinds of components of which any of the above nylons are composed, and the like.

The method of carrying out reaction of a ring-opening polymer or condensation polymer (a2) having a hydroxyl group or an amino group at both ends or at one end to an unsaturated carboxylic acid or derivative thereof (a1) is not particularly limited, and it may be any of the following methods: a method of carrying out reaction of the unsaturated carboxylic acid (a1) with a hydrocarbon-based resin, and then carrying out reaction with the polymer (a2); a method of carrying out reaction of the polymer (a2) partially with the unsaturated carboxylic acid (a1) added to the hydrocarbon-based resin while removing the unreacted unsaturated carboxylic acid (a1), when carrying out reaction of the unsaturated carboxylic acid (a1) with a hydrocarbon-based resin; and further a method of mixing the unsaturated carboxylic acid (a1) and the polymer (a2) with a blender or the like while they are still unmelted, and then carrying out reaction by making use of the melting when fabricating a laminate.

The amount of the unsaturated carboxylic acid anhydride or derivative thereof (a1) present in the resin composition (A) in the present invention is preferably from 0.1 to 50 mg KOH/g in terms of an acid value with a potassium hydroxide/ethanol solution (condition ($\alpha$)), and more preferably from 0.5 to 45 mg KOH/g. The adhesion with EVOH is insufficient in a case of 0.1 mg KOH/g or less, whereas in a case of 50 mg KOH/g or more, the thermal stability deteriorates due to the crosslink within the resins (A), causing roughness in the film surface, deterioration in color, and moreover a decrease in the adhesive strength.

In the present invention, the condition ($\beta$), which means the amount of the ring-opening polymer or condensation polymer (a2) having a hydroxyl group or an amino group at both ends or at one end, is an amount determined upon ensuring the condition ($\alpha$), which shows the amount of the unsaturated carboxylic acid anhydride or derivative thereof (a1), which is the site reacted with EVOH. That is, where x is defined as a sum of peak heights of peaks (1713 cm$^{-1}$, 1780 cm$^{-1}$) derived from an acid anhydride group and y is defined as a peak (1740 cm$^{-1}$) derived from an ester group, all peaks by IR spectrum, $y/(x+y)*100$ is preferably 10(%) or more, more preferably 15 or more, and even more preferably 20 or more. Since acid anhydride groups may be affected by, for example, ether or secondary amine to cause the peaks less detectable by the IR spectrum, the value obtained by $y/(x+y)*100$ is not a numerical value representing the amount of acid anhydride groups/the amount of ester groups present in the skeleton in reality, and moreover there is no upper limitation because no peak may be detected at all for the acid anhydride group. The value obtained by $y/(x+y)*100$ is a value determined by the amount of the unsaturated carboxylic acid anhydride or derivative thereof (a1), which is the site reacted with EVOH, and the amount, the structure, the molecular weight, and the like of the ring-opening polymer or condensation polymer (a2) having a hydroxyl group or an amino group at both ends or at one end in the present invention, and no effect is found in a case of less than 10 in the present invention to exhibit the effect of the ring-opening polymer or condensation polymer (a2) having a hydroxyl group or an amino group at both ends or at one end.

The resin compositions (A) of the present invention can be produced by mixing the ring-opening polymer or condensation polymer (a2) having a hydroxyl group or an amino group at both ends or at one end and the unsaturated carboxylic acid anhydride or derivative thereof (a1), at a certain ratio of the amount of the polymer (a2) added and the mole number of all hydroxyl groups or amino groups to be reacted with the (a1), or by graft-reacting the polymer (a2) with the (a1) component. The amount of the polymer (a2) to be added in the present invention is, regardless of the kind of the hydroxyl group or the amino group, preferably from 0.5 to 20 mol % and more preferably from 1 to 18 mol %, relative to the unsaturated carboxylic acid (a1). The effect of the polymer (a2) is not exhibited in a case of less than 0.2 mol %, whereas the effect is prone to be reduced in a case of exceeding 20 mol %. The reason is supposed to be because the increase in the amount of the polymer (a2) inhibits the adhesion of the (a1) with polar resins.

When adding the ring-opening polymer or condensation polymer (a2) having a hydroxyl group or an amino group at both ends or at one end, an alkali metal, such as potassium acetate, potassium hydroxide, or sodium hydrogen carbonate, is further added as an accelerant as needed, and an increased amount of such an accelerant is required to be added for a large amount of the ring-opening polymer or condensation polymer (a2) having a hydroxyl group or an amino group at both ends or at one end, while the increase in the amount to be added causes easy deterioration in color due to, for example, deterioration of PP and thus deteriorates the processability. From the perspective of the processability, the amount to be added of the ring-opening polymer or condensation polymer (a2) having a hydroxyl group or an amino group at both ends or at one end is, although varied depending on the end structure, the molecular weight, and the like, preferably from 0.5 to 15 mol % and more preferably from 2 to 10 mol % relative to the unsaturated carboxylic acid (a1).

The ring-opening polymer or condensation polymer (a2) having a hydroxyl group or an amino group at both ends or at one end, which gives the effect of assisting adhesion with polar resins in the present invention, has the number average molecular weight (hereinafter, may be referred to as Mn, or simply as a molecular weight) of preferably from 400 to 20000. No effect is exhibited in a case of less than 400 because the molecular chains are too short, whereas a decrease in the adhesive strength occurs in a case of exceeding 20000, which is considered to be because the too long molecular chains inhibit the effect of adhesion. The molecular weight is more preferably in the range of from 600 to 15000.

The resin composition (A) in the present invention desirably has a melt flow rate (hereinafter, referred to as MFR) at 190° C. of from 1 to 200 when used for applications as an adhesive resin with a resin composition comprising EVOH. The dispersibility in the polyolefin (B), with which the resin composition (A) is diluted, is insufficient in a case of the MFR being less than 1, whereas the resin composition (A) is too finely dispersed in a case of higher than 200, and in either case, the adhesive strength with polar resins is severely decreased. In a case of using for applications other than as an adhesive resin, such as a compatibilizer or a modifier for a polar resin, the MFR is determined in accordance with properties of the polar resin and thus the MFR is not limited to the range of from 3 to 200.

The present invention is a resin composition comprising the resin composition (A) and the polyolefin (B). In further detail, the present invention is an adhesive resin composition for the resin (C), in which resin composition (A): polyolefin (B) is from 2:98 to 40:60, wherein the resin composition has an acid value of from 0.1 to 4 mg KOH/g with a potassium hydroxide/ethanol solution.

To the resin composition comprising the resin composition (A) and polyolefin (B), antioxidants, plasticizers, pigments, heat stabilizers, UV absorbers, antistatic agents, lubricants, colorants, fillers or other resins may be blended, unless the effect of the invention is inhibited.

The method of blending the resin composition (A) and the polyolefin (B) is not particularly limited as long as they are uniformly blended. That is, it may be dry blending, in which they are blended still in the form of a solid, or may be melt blending in which a mixture obtained by dry blending is pelletized with a melt extruder. As a manner of melt blending, there are methods of using, for example, a ribbon blender, a mixer, a co-kneader, a pelletizer, a mixing roll, an extruder, and an intensive mixer. Among these, single-screw or twin-screw extruders are preferably used in view of simple procedures and costs. Although the temperature for blending is selected as appropriate depending on, for example, the properties of the instrument and the types and blending ratios of the resins, it often falls in a range of from 150 to 300° C. For shaping a multilayer structure, melt-kneading can also be carried out with an extruder provided with the shaping machine.

The polyolefin (B) is required to have properties and conditions that can form a laminate, and may be the hydrocarbon-based resins mentioned as the examples of the resin to be a main material when structured as the above graft polymer, and may also be a single kind or two or more kinds of such hydrocarbon-based resins. However, when using the laminate as retort packaging containers, composition comprising a polypropylene for 50% or more is preferably used. As an example of using two or more kinds of polyolefins, resin compositions in which a polypropylene is used as a main raw material for producing the resin composition (A) and as the polyolefin (B) for diluting the resin composition (A), and further a thermoplastic elastomer, such as ethylene-propylene copolymers, which are know techniques, improving the adhesive strength with polar resins, the appearance of the laminate, and the shapability of the laminate, is blended as a second polyolefin may be representative examples. In addition, to the polyolefin (B), other resins may also be blended, unless the effect of the present invention is inhibited. For example, by blending a small amount of polyethylene, the mechanical property of a shaped product can be adjusted. Moreover, by blending a rubber component, such as so-called HIPS (high impact polystyrene), the impact resistance can also be improved.

The polypropylene is not particularly limited as long as it is a polymer having propylene as a major constitutional unit, and is usually a polymer comprising 50 weight % or more of propylene units. Other than homopolymers of propylene, copolymers with other comonomers may be used, such as ethylene-propylene copolymers and propylene-α-olefin copolymers. Such a copolymer often has good interlayer adhesion compared to homopolymers. On the other hand, such a copolymer has less rigidity and a lower melting point compared to homopolymers, so that it is used in accordance with applications taking it into account. Such a polypropylene preferably has the melting point of from 115 to 190° C., and considering the retortability, more preferably at 120° C. or higher, and even more preferably at 140° C. or higher.

The type of the thermoplastic elastomer blended as the second polyolefin is not particularly limited, and it is possible to use polyolefin-based elastomers, polystyrene-based elastomers, polyurethane-based elastomers, polyester-based elastomers, polyamide-based elastomers, and the like. However, among these, considering the compatibility with the polyolefin and the (a2), costs, and the like, polyolefin-based elastomers or polystyrene-based elastomers are preferred, and polyolefin-based elastomers are most suited.

As the polyolefin-based elastomer, any of polyethylene-based elastomers and polypropylene-based elastomer can be used. In this context, polyethylene-based elastomers mean elastomers including 50 weight % or more of ethylene, and polypropylene-based elastomers mean elastomers including 50 weight % or more of propylene. Among them, ethylene-based elastomers are preferably used, and it is possible to use products obtained by copolymerizing ethylene with monomers capable of copolymerization, such as α-olefin, vinyl acetate, and alkyl (meth)acrylate. In particular, it is preferred that ethylene-α-olefin copolymers have a density less than 0.89 g/cm$^3$. The effect of improving the adhesion is not sufficient in a case of a density of 0.89 g/cm$^3$ or more, and the density is more preferably 0.885 g/cm$^3$ or less. In contrast, the density is usually 0.85 g/cm$^3$ or more. Particularly preferred ethylene-α-olefin copolymers are ethylene-propylene copolymers and ethylene-1-butene copolymers. Examples of the preferred polystyrene-based elastomers include (hydrogenated) styrene-diene-styrene block copolymers and the like.

The Vicat softening temperature (measured in accordance with JIS K 7206) of such a thermoplastic elastomer is preferably from 40 to 80° C. It is supposed that using such a thermoplastic elastomer having a relatively low softening temperature causes change in the distribution of each component in the resin composition (A) when heated in, for example, retort processing or secondary processing, which results in improvement of the adhesion strength after retort processing. When the Vicat softening temperature is less than 40° C., the adhesion strength may not be sufficient at operating temperatures, and the Vicat softening temperature is more preferably at 50° C. or higher. On the other hand, when the Vicat softening temperature is over 80° C., the interlayer adhesion may be decreased, and the Vicat softening temperature is more preferably at 75° C. or lower.

The melt flow rate (at 190° C., under a load of 2160 g) of the thermoplastic elastomer is preferably from 0.2 to 30 g/10 min. When the melt flow rate is included in such a range, the dispersibility of each resin component in the resin composition (A) becomes good. The melt flow rate is more preferably at 0.3 g/10 min or more. The melt flow rate is more preferably at 20 g/10 min or less.

When using the resin composition (A) as an adhesive resin composition for EVOH, the ratio of the resin composition (A) to the polyolefin (B) is preferably from 2:98 to 40:60. The adhesive strength does not sufficiently function when the resin composition (A) is less than 2 weight %, whereas, when it is over 40 weight %, the adhesion strength sharply decreases due to the crosslink within the graft polymers and further fish eyes and orange peels are generated during production of a laminate.

When using the resin composition (A) as an adhesive resin composition for the polar resin (C), the mixture of the resin composition (A) and the polyolefin (B) preferably has an acid value of from 0.1 to 4 mg KOH/g with a potassium hydroxide/ethanol solution. The adhesive strength does not function sufficiently in a case of less than 0.1 mg KOH/g, whereas the adhesive strength decreases, which is supposed to be caused by crosslink within the resin composition (A), in a case of exceeding 4 mg KOH/g.

In the present invention, the resin composition comprising the resin composition (A) and the polyolefin (B) is used as an intermediate layer for a laminate between the polar resin (C) and the outer layer resin (D) or recovered resin (E). A preferred application of the resin composition (A) of the present invention is an adhesive resin, and it is preferably used as an adhesive resin to adhere a barrier resin layer and a polyolefin layer. A preferred embodiment of the present invention is a multilayer structure in which a polar resin (C) layer and an outer layer resin (D) layer are laminated via a layer of the resin composition (A). The use of the resin composition (A) as an adhesive resin enables to obtain a laminate having good interlayer adhesion. The structure of such a laminate is not limited as long as it has a layer of the adhesive resin composition making contact with a layer of the polar resin (C) at the interface, and as long as the layer of the resin composition comprising the resin (A) does not easily peel from the layer which is making contact with the opposite side of the layer of the polar resin (C) in accordance with applications.

The laminates obtained by the present invention contain a layer of the polar resin (C). Since a layer made of a resin composition comprising EVOH, which is one of the polar resins (C), has low oxygen permeability and low water vapor permeability, the laminates obtained by the present invention can be used for a wide range of applications, such as gas tanks, balloons, pipes, packaging materials for foods, drugs, and chemical products. Since polyamide is excellent in heat resistance and wear resistance, the laminates can also be used for applications, such as retort containers and films. The resin composition comprising EVOH is an EVOH (c1) only, or resins which have the EVOH (c1) as a major component and are blended with, for giving retort processing resistance, polyamide or crosslinked EVOH, or for promoting the flexibility, plasticizers, resins having a reduced crystallization rate made of modified EVOH, or a (c2).

The EVOH (c1) used for the laminates of the present invention can be produced by known methods of copolymerizing ethylene and vinyl ester with a radical initiator and subsequently saponifying in the presence of an alkali catalyst. Examples of such a vinyl ester include vinyl acetate, vinyl propionate, vinyl pivalate, vinyl caprate, vinyl benzoate, and the like. Among such vinyl esters, only one kind may be used and two or more kinds may also be used in combination. Among these, vinyl acetate is preferred.

Unless the object of the present invention is inhibited, copolymerization may also be performed in the presence of other copolymerizable components. In this context, such other components include the followings: olefin-based monomers such as propylene, 1-butene and isobutene; acrylamide-based monomers such as acrylamide, N-methylacrylamide, N-ethylacrylamide and N,N-dimethylacrylamide; methacrylamide-based monomers such as methacrylamide, N-methylmethacrylamide, N-ethylacrylamide and N,N-dimethylmethacrylamide; vinyl ether-based monomers such as methyl vinyl ether, ethyl vinyl ether, n-propyl vinyl ether, isopropyl vinyl ether, tert-butyl vinyl ether and dodecyl vinyl ether; allyl alcohol; vinyltrimethoxysilane; N-vinyl-2-pyrrolidone; and the like. They do not have functional groups of at least one kind selected from the group consisting of a boronic acid group and boron-containing groups capable of being converted into a boronic acid group in the presence of water.

Although the ethylene content of the EVOH (c1) is not particularly limited, it is preferably from 5 to 60 mol %. When the ethylene content is less than 5 mol %, the melt stability may become insufficient, and it is more preferably 15 mol % or more, and even more preferably 20 mol % or more. On the other hand, when the ethylene content exceeds 60 mol %, the barrier properties may become insufficient, and it is more preferably 55 mol % or less, and even more preferably 50 mol % or less. The saponification degree of the EVOH (c1) is usually from 80 to 100 mol %, preferably from 90 to 100 mol %, more preferably from 95 to 100 mol %, even more preferably from 98 to 100 mol %, and most preferably from 99 to 100 mol %. When the saponification degree is low, the barrier properties of the EVOH (c1) may become insufficient or the thermal stability during melt-molding may become insufficient.

Since one of the characteristics of the resin compositions and the laminates of the present invention is the maintenance or improvement of the adhesion after retort processing, the polar resin (C) is preferably made of a resin composition comprising from 3 to 50 parts by weight of a polyamide (c2) in terms of 100 parts by weight of the EVOH (c1) in order to maintain the gas barrier properties of the EVOH. Blending the polyamide (c2) enables to improve the retort resistance of the layer of the polar resin (C). In a case that the polyamide (c2) is blended less than 3 parts by weight, the retort resistance may become insufficient, and the amount is more preferably 5 parts by weight or more, and even more preferably 7 parts by weight or more. On the other hand, in a case that the polyamide (c2) is blended more than 50 parts by weight, the gas barrier properties may deteriorate and the interlayer adhesion may be decreased, and the amount is more preferably 30 parts by weight or less, and even more preferably 25 parts by weight or less. The type of the polyamide (c2) is not particularly limited, and examples of the polyamide (c2) include the followings: 6-nylon, 6,6-nylon, 6,10-nylon, 11-nylon, 12-nylon, and further nylon copolymers comprising two or more kinds of components of which any of the above nylons are composed.

The melt flow rate (MFR) (at 190° C., under a load of 2160 g) of the resin composition comprising the EVOH is preferably from 0.1 to 16 g/10 min, more preferably from 0.3 to 14 g/10 min, and even more preferably from 0.5 to 12 g/10 min. However, for such resins having a melting point around 190° C. or exceeding 190° C., a MFR is defined as a value obtained by measuring at a plurality of temperatures of the melting point or higher under a load of 2160 g, plotting the results with reciprocals of absolute temperatures as abscissa against logarithms of MFRs as ordinate in a semi-logarithmic graph, and then extrapolating to 190° C.

Examples of the polyamide, which is one of the polar resins (C), include 6-nylon, 6,6-nylon, 6,10-nylon, 11-nylon, 12-nylon, and further nylon copolymers comprising two or more kinds of components of which any of the above nylons are composed, and every one of them is applicable. In addition, the relative viscosity of the polyamide in the present invention is preferably from 1.5 to 8.0, and more preferably from 2.0 to 7.0.

An example of the outer layer resin (D) includes a layer having polyolefin as a major component. Such a polyolefin may be the polyolefins mentioned as the examples of the polyolefin (B), and although either one kind of them or two or more kinds of them in combination may be used in accordance with applications, polypropylene is applied when considering the retort resistance.

The recovered resin (E) is a thermoplastic resin comprising from 0.1 to 100 weight % of a ground product of a laminate comprising at least one layer of EVOH. There is also no problem to include portions of snippets that are left over while a laminate is processed to make a shaped product interposed between the polyolefin layer and the adhesive resin layer for the purpose of reducing the environmental load. To the recovered resin (E), fillers or various additives may also be blended further.

The method of producing a laminate in the present invention may adopt known methods, and it is possible to use a method, such as coextrusion, coinjection, or extrusion coating. From the perspective of versatility and adhesion, coextrusion and coinjection are useful. When coextruding or coinjecting, it is possible to feed the polar resin (C), the outer layer resin (D) or recovered resin (E), and the resin composition (A) each to a shaping machine.

The layer constitution of the laminate in the present invention is not particularly limited as long as a polar resin (C) layer and an outer layer resin (D) layer are laminated to each other via a layer of the adhesive resins (A+B). Examples of the layer constitution include C/A+B/D, D/A+B/C/A+B/D, D/A+B/C/A+B/T, D/A+B/C/T, and the like. Here, A+B, the C layer, D and T respectively represent a layer of the adhesive resin composition (A+B), a layer of the polar resin (C), a layer of the polyolefin (D) or the outer layer resin (E), and a layer of a thermoplastic resin other than these. The D layer may be constituted of a plurality of layers, and for example, it may be composed of a layer of the outer layer resin (D) and a layer of the outer layer resin (E). The polar resin (C) may also be formed in a two-layer structure, such as a resin composition comprising polyamide/EVOH. Such a laminate may further have layers of metal foil, paper, cloth, resins other than the polar resin (C), the outer layer resin (D), and the resin composition (A+B), and the like. The thicknesses of the individual layers of the multilayer structure may optionally be selected, which enables the total thickness of the multilayer structure to fall within a desired range.

The laminates obtained by the present invention are characterized in the improved adhesion strength more than that of adhesive resin compositions using conventional maleated polyolefin. Particularly under the conditions of boiling and retort, the adhesion strength are not improved conventionally, and prone to be decreased in some cases, whereas an effect of maintaining or improving the adhesion strength is found in the present invention by compatibilizing the polar resin with the hydrophilic portions of modified maleated polyolefin.

The present invention is described even more specifically below by way of Examples and Comparative Examples. It should be noted, though, that the scope of the present invention is not at all limited to these Examples.

In the following Examples, the conditions ($\alpha$) and ($\beta$), and the MFR of the adhesive resin compositions (A) were determined by the methods below.

[Condition ($\alpha$)]

One gram of a sample was dissolved in 80 mL of xylene and was titrated with corrected 0.05 mol/L (liter, same below) of a potassium hydroxide/ethanol solution to determine the acid value and the amount of the acid anhydride from the titration value by the formula below.

[Acid Value (mg KOH/g)]

The acid value was calculated by the calculation formula below.

$$(\text{Titration Value (mL)} - \text{Blank Value (mL)}) \times 56.1 \times 0.05 \times (\text{Correction Factor of Potassium Hydroxide in Ethanol Solution})/\text{mass (mg)}$$

[Condition ($\beta$)]

A sample was melt-kneaded at 220° C. for 5 minutes and cooled to room temperature, and then the infrared ray absorption spectrum was measured with a microscopic IR (AutoIMAGE, SpectrumOne) manufactured by Perkin Elmer Co., Ltd. Among the obtained infrared ray absorption spectrum, where x is defined as a sum of peak heights of peaks (1713 cm$^{-1}$, 1780 cm$^{-1}$) derived from the acid anhydride group and y is defined as a height of a peak (1740 cm$^{-1}$) derived from the ester group, the condition ($\beta$) was determined by the calculation formula below. Pseudo Ratio (%) of Ester/Carboxylic Acid+Acid Anhydride=y/x×100

[MFR of Resin (A)]

The MFR of the resin (A) was measured based on JIS Standard K 7210.

Example 1

Six hundred grams of a polypropylene (E-105GM, produced by Idemitsu Kosan Co., Ltd., MFR (at 230° C., for 10 minutes)=0.5, homopolypropylene), 69.91 g of a maleic anhydride, and 2000 g of a tert-butyl benzene were charged in a separable flask of 5000 mL and it was purged with a nitrogen atmosphere, and then the polypropylene was dissolved at 160° C. After dissolution, 10.21 g of a di-tert-butyl peroxide was added to 100 g of a tert-butyl benzene, and they were reacted for two hours while stirring. Subsequently, the reacted liquid was taken out to be stirred at room temperature, and thereby a resin was precipitated in powder. The resulting powder was washed with acetone and then vacuum dried, and thereby yielding 660.3 g of a maleated polypropylene (sample 1) of white powder having an acid value of 22.4 (partial acid value, mg KOH/g).

With 200 g of the resulting sample 1 measured out, 400 g of a xylene, 13.67 g of a polyethylene glycol (PEG 6000 produced by Sanyo Chemical Industries, Ltd., molecular weight=8200), 0.19 g of a potassium acetate, and 1 g of an acetic acid were charged in a separable flask of 2000 mL and it was purged with a nitrogen atmosphere, and then the polypropylene was dissolved by stirring at 160° C. for 20 minutes. Subsequently, a distillation apparatus was installed in a reactor vessel to distil the acetic acid and the xylene away. After that, the reacted liquid was taken out and was stirred at room temperature, and thereby a resin was precipitated in powder. The resulting powder was washed with acetone and then was vacuum dried, and thereby yielding 212.5 g of a polyethylene glycol partially modified maleated polypropylene (sample 2) of light yellow powder. With sample 2, the value for the condition ($\alpha$) was 21.3 (mg KOH/g), and the value for the condition ($\beta$) was 98(%).

A polypropylene ("NOVATEC PP" EG7F produced by Japan Polypropylene Corporation, MFR (at 230° C., for 10 minutes)=1.3) and an ethylene-propylene copolymer (TAFMER P0480 produced by Mitsui Chemicals, Inc., MFR (at 230° C., for 10 minutes)=5.4) were melt blended in advance at a mass ratio of polypropylene/ethylene-propylene copolymer=7/2 with a twin-screw segment extruder having a screw diameter of 25 mm$\phi$ to fabricate pellets, and 10 weight % of sample 2 was further added in the extruder and thus an adhesion resin composition was obtained. The degree of coloration of the resin composition was evaluated according to the following criteria, and the results were shown in Table 1.
○: Not easily colored
Δ: Easily colored
X: Immediately colored Using the resulting resin composition as a layer of an adhesive resin, a polypropylene ("NOVATEC PP" EG7F produced by Japan Polypropylene Corporation, MFR (at 230° C., for 10 minutes)=1.3) as outer layer resin and a polyamide-containing EVOH (a resin composition in which 90 parts by weight of EVOH having an ethylene content of 27 mol % and the melting point of 188° C. and 10 parts by weight of a 6-nylon having the melting point of 220° C. were blended and had the MFR (at 230° C., for 10 minutes) of 10, hereinafter, may be referred to as a polar resin C-1), 3-kind 5-layer coextrusion of polypropylene layer/adhesive layer/EVOH layer/adhesive layer/polypropylene layer=50 μm/10 μm/10 μm/10 μm/50 μm was carried out with a feedblock die to fabricate a film. Each resin was fed to the feedblock with a 32 mm$\phi$ extruder for the polypropylene layers, a 25 mm$\phi$ extruder for the adhesive layer composition, and a 20 mm$\phi$ extruder for the EVOH layer, and the temperature for the extrusion was at 220° C. for each resin and was also at 220° C. for the die unit and the feedblock unit. The resulting 3-kind 5-layer film was subjected to peeling between the EVOH/adhesive layers, and the peel strength was measured with an Autograph (tensile speed=250 mm/min) under the conditions of 20° C. and 65% RH, and the result was 1438 g/15 mm.

A 3-kind 5-layer film of polypropylene layer/adhesive layer/EVOH layer/adhesive layer/polypropylene layer=50 μm/10 μm/10 μm/10 μm/50 μm was immersed in a water bath at 85° C. for 30 minutes, and then the peel strength between the EVOH/adhesive layers was measured, and the result was 1490 g/15 mm.

The resulting 3-kind 5-layer film of polypropylene layer/adhesive layer/EVOH layer/adhesive layer/polypropylene layer=50 μm/10 μm/10 μm/10 μm/50 μm was fabricated into a pouch of 10 cm×10 cm by a heat sealer, and distilled water was filled therein, and then the distilled water was sealed again by a heat sealer. The resulting pouch with distilled water therein was subjected to retort processing at 120° C. for 30 minutes, and then the pouch was cooled for 1 hour, followed by peeling between the EVOH/adhesive layers to measure the adhesive strength, and the result was 1550 g/15 mm. The results are shown in Tables 1 to 3.

Comparative Example 1

The series of tests were performed in accordance with the methods described in Example 1 other than omitting the step of fabricating sample 2 according to Example 1. The results are put together and shown in Tables 1 to 3.

Comparative Example 2

The series of tests were performed in accordance with the methods described in Example 1 other than charging 0.073 g of an ethylene glycol instead of 13.67 g of the polyethylene glycol (PEG 6000 produced by Sanyo Chemical Industries, Ltd., molecular weight=8200) in the step of fabricating sample 2 according to Example 1. The results are put together and shown in Tables 1 to 3.

Comparative Example 3

The series of tests were performed in accordance with the methods described in Example 1 other than changing the amount of di-tert-butyl peroxide to 1.70 g used in the step of fabricating sample 1 according to Example 1 and omitting the step of fabricating sample 2. The results are put together and shown in Tables 1 to 3.

Example 2

The series of tests were performed in accordance with the methods described in Example 1 other than charging 13.67 g of a polyethylene glycol (PEG 600 produced by Sanyo Chemical Industries, Ltd., molecular weight=600) instead of 13.67 g of the polyethylene glycol (PEG 6000 produced by Sanyo Chemical Industries, Ltd., molecular weight=8200) in the step of fabricating sample 2 according to Example 1. The results are put together and shown in Tables 1 to 3.

Example 3

The series of tests were performed in accordance with the methods described in Example 1 other than charging 6.67 g of a polyethylene glycol monomethyl other (MeO-PEG 2000 produced by Toho Chemical Industry Co., Ltd., molecular weight=2000) instead of 13.67 g of the polyethylene glycol (PEG 6000 produced by Sanyo Chemical Industries, Ltd., molecular weight=8200) in the step of fabricating sample 2 according to Example 1. The results are put together and shown in Tables 1 to 3.

Example 4

The series of tests were performed in accordance with the methods described in Example 1 other than changing the amount of the polyethylene glycol (PEG 6000 produced by Sanyo Chemical Industries, Ltd., molecular weight=8200) from 13.67 g to 5.47 g in the step of fabricating sample 2 according to Example 1. The results are put together and shown in Tables 1 to 3.

Example 5

In an autoclave of 1 liter, 170 g of ε-caprolactam and 1.53 g of water were charged and it was purged with nitrogen, and then heated at 240° C. for 4 hours while stirred. The resulting crude nylon oligomer was cooled and solidified, and then was ground, and further was stirred in 500 ml of methanol at 60° C. for 1 hour, followed by filtration and then was vacuumed overnight at 60° C., and thereby yielding 150 g of a nylon-6 (hereinafter, may be referred to as Ny-6) oligomer (sample 3).

The resulting Ny-6 was subjected to $^1$H-NMR measurement of 500 MHz and thereby determining the molecular weight=4000.

The series of tests were performed in accordance with the methods described in Example 1 other than charging 6.51 g of sample 3 instead of the polyethylene glycol (PEG 6000 produced by Sanyo Chemical Industries, Ltd., molecular weight=8200) in the step of fabricating sample 2 according to Example 1. The results are put together and shown in Tables 1 to 3.

Example 6

The series of tests were performed in accordance with the methods described in Example 1 other than changing the amount of the polyethylene glycol (PEG 6000 produced by Sanyo Chemical Industries, Ltd., molecular weight=8200) from 13.67 g to 27.34 g in the step of fabricating sample 2 according to Example 1. The results are put together and shown in Tables 1 to 3.

Example 7

The series of tests were performed in accordance with the methods described in Example 1 other than changing the amount of the polyethylene glycol (PEG 6000 produced by Sanyo Chemical Industries, Ltd., molecular weight=8200) from 13.67 g to 41.01 g in the step of fabricating sample 2 according to Example 1. The results are put together and shown in Tables 1 to 3.

Comparative Example 4

The series of tests were performed in accordance with the methods described in Example 1 other than changing the amount of the polyethylene glycol (PEG 6000 produced by Sanyo Chemical Industries, Ltd., molecular weight=8200) from 13.67 g to 54.68 g in the step of fabricating sample 2 according to Example 1. The results are put together and shown in Tables 1 to 3.

Comparative Example 5

The series of tests were performed in accordance with the methods described in Example 1 other than charging 0.144 g of a hydroxy-terminated hydrogenated 1,4-polybutadiene ("Polytail H" produced by Mitsubishi Chemical Corporation, molecular weight=2900) instead of 13.67 g of the polyethylene glycol (PEG 6000 produced by Sanyo Chemical Industries, Ltd., molecular weight=8200) in the step of fabricating sample 2 according to Example 1. The results are put together and shown in Tables 1 to 3.

Example 8

Synthesis Example

Synthesis of Maleic Anhydride Modified PP

A polypropylene (E-105GM, produced by Idemitsu Kosan Co., Ltd., MFR (at 230° C., for 10 minutes)=0.5, homopolypropylene) and a maleic anhydride were mixed in advance at a ratio of polypropylene/maleic anhydride=95/5, and was fed to a twin-screw extruder at a rate of 10 kg/hr while purging the feed port with 1 L/min nitrogen. Subsequently, a mixed liquid of di-tert-butyl hydroperoxide and chlorobenzene (di-tert-butyl hydroperoxide/chlorobenzene=99/1, weight ratio) was fed from a liquid feeder 1 at a rate of 1 kg/hr and was continuously kneaded. While kneaded, the pressure was regulated so that the gauges at a vent 1 and a vent 2 indicated approximately 20 mmHg. As a result, a maleic anhydride modified polypropylene (sample 4) was obtained from the discharge port at a rate of 7 kg/hr.

The constitution and operating conditions of the twin-screw extruder used for the above reaction are as follows:
Co-rotating twin-screw extruder TEM-35B (manufactured by Toshiba Machine Co., Ltd.)
Screw diameter: 37 mmφ
L/D: 52 (15 blocks)
Liquid feeder: C3 (Liquid feeder 1), C11 (Liquid feeder 2)
Vent position: C6 (Vent 1), C14 (Vent 2)
Constitution of screws: Seal rings were used between C5 and C6, between C10 and C11, and at C12.
Cylinder setting temperature: C1 (water cooling), C2-C3 (200° C.), C4-C15 (250° C.), die (250° C.)
Screw rotation speed: 200 rpm A polypropylene ("NOVATEC PP" EC7F produced by Japan Polypropylene Corporation, MFR (at 230° C., for 10 minutes)=1.3) and an ethylene-propylene copolymer (TAFMER P0480 produced by Mitsui Chemicals, Inc., MFR (at 230° C., for 10 minutes)=5.4, hereinafter, may be referred to as EP) were melt blended in advance at a mass ratio of polypropylene/ethylene-propylene copolymer=2/1 with a twin-screw segment extruder having a screw diameter of 25 mmφ to fabricate pellets. The results are put together and shown in Tables 1 to 3.

The series of tests were performed in accordance with the methods described in Example 1 other than changing sample 1 described in Example 1 into sample 4, changing the pellets of polypropylene/ethylene-propylene copolymer=7/2 into pellets of 2/1, and changing the blend ratio from sample 1: (pellets of polypropylene/ethylene-propylene copolymer=7/2)=10:90 into sample 4: (pellets of polypropylene/ethylene-propylene copolymer=2/1)=40:60. The results are put together and shown in Tables 1 to 3.

Example 9

The series of tests were performed in accordance with the methods described in Example 1 other than changing the pellets of polypropylene/ethylene-propylene copolymer=7/2 described in Example 1 into a polypropylene, and changing the blend ratio from sample 1: (pellets of polypropylene/ethylene-propylene copolymer=7/2)=10:90 into sample 1: polypropylene=10:90. The results are put together and shown in Tables 1 to 3.

Example 10

A polypropylene ("NOVATEC PP" EG7F produced by Japan Polypropylene Corporation, MFR (at 230° C., for 10 minutes)=1.3), EVOH (32 mol % of ethylene content, 99.7 mol % of degree of saponification, 1.1 dL/g of the intrinsic viscosity in aqueous phenol at 30° C., hereinafter, may be referred to as a polar resin C-2), and sample 1 were melt blended at a mass ratio of polypropylene/EVOH/sample 1=97.8/2.0/0.2 by a twin-screw segment extruder having a screw diameter of 25 mmφ to fabricate pellets of a model recovered resin (sample 7).

The series of tests were performed in accordance with the methods described in Example 1 other than changing the outer layer resin described in Example 1 from "NOVATEC PP" EG7F into sample 7. However, the peel strength after retort processing was not able to be measured because the polar resin C-2 layer was deformed. The results are put together and shown in Tables 1 to 3.

Example 11

The series of tests were performed in accordance with the methods described in Example 1 other than changing the polyamide-containing EVOH described in Example 1 into the polar resin C-2, which did not comprise polyamide. The results are put together and shown in Tables 1 to 3.

Comparative Example 6

The series of tests were performed in accordance with the methods described in Comparative Example 1 other than changing the polyamide-containing EVOH according to Comparative Example 1 into the polar resin C-2, which did not comprise polyamide. However, the peel strength after retort processing was not able to be measured because the EVOH layer was deformed. The results are put together and shown in Tables 1 to 3.

TABLE 1

| | Resin composition (A) | | | | | | | |
|---|---|---|---|---|---|---|---|---|
| | Constitution | | | Condition | | | | |
| | | | Component (a2) | | | | Blended | Shapa- |
| | | | | Added | | β | MI | amount | bility |
| | Resin | Component (a1) | Raw material | amount | α *1 | (%) | *2 | (weight %) | *5 (color) |
| Example 1 | PP | Maleic anhydride | PEG (Mn = 8200) | 5 | 20.2 | 98 | 8.9 | 10 | ○ |
| Comparative Example 1 | PP | Maleic anhydride | — | 0 | 21.3 | 0 | 33.0 | 10 | Δ |
| Comparative Example 2 | PP | Maleic anhydride | EG (Mn = 44) | 5 | 20.2 | 5 | 31.6 | 10 | ○ |
| Comparative Example 3 | PP | Maleic anhydride | PEG (Mn = 8200) | 5 | 2.4 | 97 | 0.9 | 10 | ○ |
| Example 2 | PP | Maleic anhydride | PEG (Mn = 600) | 5 | 20.2 | 88 | 12.5 | 10 | ○ |
| Example 3 | PP | Maleic anhydride | MeO-PEG (Mn = 2000) | 5 | 20.2 | 92 | 13.1 | 10 | ○ |
| Example 4 | PP | Maleic anhydride | PEG (Mn = 8200) | 2 | 20.9 | 19 | 22.3 | 10 | ○ |
| Example 5 | PP | Maleic anhydride | Ny-6 (Mn = 4000) | 3 | 20.7 | 92 | 9.5 | 10 | ○ |
| Example 6 | PP | Maleic anhydride | PEG (Mn = 8200) | 10 | 19.2 | 219 | 5.1 | 10 | ○ |
| Example 7 | PP | Maleic anhydride | PEG (Mn = 8200) | 15 | 18.1 | 334 | 3.5 | 10 | Δ |
| Comparative Example 4 | PP | Maleic anhydride | PEG (Mn = 8200) | 20 | 17.0 | 443 | 3.1 | 10 | X |
| Comparative Example 5 | PP | Maleic anhydride | Polytail H | 5 | 20.2 | 6 | 9.2 | 10 | ○ |
| Example 8 | PP | Maleic anhydride | PEG (Mn = 8200) | 5 | 6.2 | 70 | 6.5 | 40 | ○ |
| Example 9 | PP | Maleic anhydride | PEG (Mn = 8200) | 5 | 20.2 | 98 | 8.9 | 10 | ○ |
| Example 10 | PP | Maleic anhydride | PEG (Mn = 8200) | 5 | 20.2 | 98 | 8.9 | 10 | ○ |
| Example 11 | PP | Maleic anhydride | PEG (Mn = 8200) | 5 | 20.2 | 98 | 8.9 | 10 | ○ |
| Comparative Example 6 | PP | Maleic anhydride | — | 0 | 21.3 | 0 | 33.0 | 10 | Δ |

*1: mg KOH/g
*2: g/10 min. @230° C.

TABLE 2

| | Resin composition (A) | | | | Polyolefin (B) | | | Outer layer |
|---|---|---|---|---|---|---|---|---|
| | Constitution | | | | | | | |
| | | | Component (a2) | | | | Polar | resin (D) or |
| | | | | Added | | Blended | resin | recovered resin |
| | | | | amount | | amount | | |
| | Resin | Component (a1) | Raw material | (mol %) | Composition | (weight %) | (C) | Composition |
| Example 1 | PP | Maleic anhydride | PEG (Mn = 8200) | 5 | PP/EP | 70/20 | C-1 | PP |
| Comparative Example 1 | PP | Maleic anhydride | — | 0 | PP/EP | 70/20 | C-1 | PP |
| Comparative Example 2 | PP | Maleic anhydride | EG (Mn = 44) | 5 | PP/EP | 70/20 | C-1 | PP |
| Comparative Example 3 | PP | Maleic anhydride | PEG (Mn = 8200) | 5 | PP/EP | 70/20 | C-1 | PP |
| Example 2 | PP | Maleic anhydride | PEG (Mn = 600) | 5 | PP/EP | 70/20 | C-1 | PP |
| Example 3 | PP | Maleic anhydride | MeO-PEG (Mn = 2000) | 5 | PP/EP | 70/20 | C-1 | PP |
| Example 4 | PP | Maleic anhydride | PEG (Mn = 8200) | 2 | PP/EP | 70/20 | C-1 | PP |
| Example 5 | PP | Maleic anhydride | Ny-6 (Mn = 4000) | 3 | PP/EP | 70/20 | C-1 | PP |
| Example 6 | PP | Maleic anhydride | PEG (Mn = 8200) | 10 | PP/EP | 70/20 | C-1 | PP |
| Example 7 | PP | Maleic anhydride | PEG (Mn = 8200) | 15 | PP/EP | 70/20 | C-1 | PP |
| Comparative Example 4 | PP | Maleic anhydride | PEG (Mn = 8200) | 20 | PP/EP | 70/20 | C-1 | PP |
| Comparative Example 5 | PP | Maleic anhydride | Polytail H | 5 | PP/EP | 70/20 | C-1 | PP |
| Example 8 | PP | Maleic anhydride | PEG (Mn = 8200) | 5 | PP/EP | 40/20 | C-1 | PP |
| Example 9 | PP | Maleic anhydride | PEG (Mn = 8200) | 5 | PP | 90 | C-1 | PP |
| Example 10 | PP | Maleic anhydride | PEG (Mn = 8200) | 5 | PP/EP | 70/20 | C-1 | Model recovered resin *2 |
| Example 11 | PP | Maleic anhydride | PEG (Mn = 8200) | 5 | PP/EP | 70/20 | C-2 | PP |
| Comparative Example 6 | PP | Maleic anhydride | — | 0 | PP/EP | 70/20 | C-2 | PP |

*1: relative to component (a1)
*2: PP/EVOH/Tie = 96.6/1.7/1.7

TABLE 3

| | Peel strength (g/15 mm) | | |
|---|---|---|---|
| | Normal | After boiling | After retort |
| Example 1 | 1440 | 1490 | 1550 |
| Comparative Example 1 | 910 | 910 | 910 |
| Comparative Example 2 | 860 | 860 | 860 |
| Comparative Example 3 | 30 | 80 | 70 |
| Example 2 | 1028 | 1190 | 1240 |
| Example 3 | 1225 | 1340 | 1400 |
| Example 4 | 1120 | 1230 | 1310 |
| Example 5 | 1260 | 1320 | 1420 |
| Example 6 | 1390 | 1410 | 1550 |
| Example 7 | 1190 | 1350 | 1390 |
| Comparative Example 4 | 890 | 870 | 740 |
| Comparative Example 5 | 900 | 900 | 900 |
| Example 8 | 1180 | 1380 | 1410 |
| Example 9 | 1140 | 1200 | 1340 |
| Example 10 | 1470 | 1490 | 1510 |
| Example 11 | 1440 | 1510 | —*1 |
| Comparative Example 6 | 890 | 940 | —*1 |

*1: Due to deformation of polar resin C-2, unable to be measured.

As understood from tables 1 to 3, compared to Comparative Example 1, in which the component (a2) was not grafted to the polypropylene with maleic anhydride, and Comparative Example 2, in which it was modified with ethylene glycol having the molecular weight of less than 400 as the component (a2), Examples in which each were modified with the respective components (a2) having the molecular weight of 400 or more had good adhesive strength before and after boiling and after retort. Further, it was found according to Examples that the present invention was applicable even when changing the amount of the component (a2) added therein, even when changing the amount of PP modified with maleic anhydride blended therein, and even in a case of an ethylene-propylene copolymer was not comprised in the polyolefin.

The invention claimed is:

1. A laminate, comprising:
    (F) an adhesive resin composition comprising (f1) an adhesive resin composition (A) produced by a process comprising mixing (a1) a resin comprising a carboxylic acid anhydride or derivative thereof (a1) with (a2) a ring-opening polymer or condensation polymer (a2) having a hydroxyl group or an amino group at both ends or at one end; or graft-reacting (a2) with (a1),
    wherein an amount of (a1) is such that an acid value of the adhesive resin composition (A) is from 6.2 to 50 mg KOH/g with a potassium hydroxide/ethanol solution,
    wherein an amount of (a2) is such that y/(x+y)*100 is 10 or more, where x is a sum of peak heights of peaks (1713 cm$^{-1}$, 1780 cm$^{-1}$) from an acid anhydride group and y is a height of a peak (1740 cm$^{-1}$) from an ester group, and all peaks are determined by infrared ray (IR) absorption spectrum measurement after melt-kneading the adhesive resin composition (A) at 220° C. for 5 minutes and then cooling to room temperature;
    wherein the added amount of (a2) is from 0.5 to 15 mol % relative to the added amount of (a1), and
    wherein (a2) is partially reacted with (a1); and
    (f2) a polyolefin (B) at a ratio (A):(B) by weight of from 2:98 to 40:60,
    wherein the adhesive resin composition (F) has an acid value of from 0.1 to 4 mg KOH/g with a potassium hydroxide/ethanol solution;
    a polar resin (C); and
    an outer layer resin (D) or a recovered resin (E),
    wherein the adhesive resin composition (F) is positioned between the polar resin (C) and the outer layer resin (D) or the recovered resin (E).

2. The laminate of claim 1, wherein the polar resin (C) is a resin composition comprising an ethylene-vinyl alcohol copolymer.

3. The laminate of claim 2, wherein the resin composition comprising an ethylene-vinyl alcohol copolymer comprises from 0.1 to 30 weight % of a polyamide.

4. The laminate of claim 1, wherein the polyolefin (B) is a thermoplastic resin composition comprising from 30 to 98 weight % of a polypropylene.

5. The laminate of claim 1, wherein the outer layer resin (D) is present and is a polypropylene.

6. The laminate of claim 1, wherein the recovered resin (E) is present and is a thermoplastic resin comprising from 0.1 to 100 weight % of a ground product of a laminate comprising an ethylene-vinyl alcohol copolymer in at least one layer.

7. The laminate of claim 1, wherein a number average molecular weight of (a2) is in a range of from 400 to 20000.

8. The laminate of claim 1, wherein the acid value of the adhesive resin composition (A) is from 10 to 45 mg KOH/g.

9. The laminate of claim 1, wherein, in the composition (A), the amount of (a2) is such that y/(x+y)*100 is 15 or more.

10. The laminate of claim 1, wherein, in the composition (A), the amount of (a2) is such that y/(x+y)*100 is 20 or more.

11. The laminate of claim 1, wherein polymer (a2) is present in (A) in an amount of from 2 to 10 mol %, relative to (a1).

12. The laminate of claim 1, wherein, in the composition (A), (a1) comprises maleic anhydride, citraconic anhydride, 2,3-dimethylmaleic anhydride, bromomaleic anhydride, chloromaleic anhydride, dichloromaleic anhydride, crotonic anhydride, 3,4,5,6-tetrahydrophthalic anhydride, itaconic anhydride, or glutaconic anhydride.

13. The laminate of claim 1, wherein polymer (a2) comprises a polyglycol having a number average molecular weight of from 400 to 20000.

14. The laminate of claim 1, wherein polymer (a2) comprises a polyglycol having a number average molecular weight of from 400 to 4000.

15. The laminate of claim 1, wherein polymer (a2) comprises at least one member selected from the group consisting of a polyethylene glycol having a number average molecular weight of 400, a polyethylene glycol having a number average molecular weight of 600, a polyethylene glycol having a number average molecular weight of 2000, a polyethylene glycol having a number average molecular weight of 4000, and a polyethylene glycol having a number average molecular weight of 8200.

* * * * *